United States Patent
McGoogan

[19]

[11] Patent Number: 6,111,738
[45] Date of Patent: *Aug. 29, 2000

[54] INTRINSICALLY SAFE CIRCUITS

[75] Inventor: Gerard McGoogan, Slamannan, United Kingdom

[73] Assignee: Diagnostic Instruments Ltd., Livingston, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/083,769

[22] Filed: May 22, 1998

[51] Int. Cl.[7] ........................................ H02H 3/20
[52] U.S. Cl. .............................. 361/91.5; 361/119
[58] Field of Search ........................ 361/54, 56, 111, 361/91, 119, 58, 91.1, 91.2, 91.4, 91.5

[56] References Cited

U.S. PATENT DOCUMENTS 4,954,923  9/1990  Hoeflich et al. ................. 361/111
5,113,303  5/1992  Herres .............................. 361/45

*Primary Examiner*—Ronald W. Leja
*Attorney, Agent, or Firm*—Fenwick & West LLP

[57] ABSTRACT

An intrinsically safe circuit for use in a hazardous environment includes a plurality of circuit sectors (1, 2) which are substantially isolated physically from one another by an electrical insulator, such as air, and are electrically connected, directly or indirectly, so as to define at lease one power transfer path (P1) between each circuit sector (1) and the other circuit sector (2) ; and power limiting means such as resistors (R1, R2) provided in each power transfer path between the connected circuit sectors for limiting the maximum power transfer value therebetween to a value less than a predetermined threshold value at which combustion in said hazardous environment is initiated. The circuit sectors (1, 2) having at least one power transfer path (P1) defined therebetween may have different sparking voltages, in which case voltage clamping means such as Zener diodes (Z1, Z2) is provided in each power transfer path between the two circuit sectors having different sparking voltages, for reducing the maximum voltage which may be applied by one of the two circuit sectors to the other.

17 Claims, 5 Drawing Sheets

INTRINSICALLY SAFE CIRCUITS

The present invention relates to intrinsically safe circuits and, more specifically, though not exclusively, to improved methods of controlling power dissipation and voltage levels in intrinsically safe circuits.

Electrical or electronic apparatus for use in hazardous environments such as those in which the apparatus will or may be exposed to potentially explosive atmospheres, for example containing inflammable gases, must be designed so as to minimise the risk of an explosion occurring. A circuit or apparatus so designed is often referred to as an "intrinsically safe circuit". The criteria by which an intrinsically safe circuit is defined are, at least in the UK, contained in various European Standards (having the status of British standards) and in particular in British Standards EN 50014 and EN50020.

To date, intrinsic safety has generally been achieved in apparatus by designing the apparatus such that the total energy storage capacity and maximum power dissipation level in the apparatus are lower than the levels specified in the relevant standards. Alternatively, large areas of the apparatus are completely enclosed or encapsulated in insulating material. The former method has the disadvantage of placing severe restraints on the circuit design for the apparatus, making the design of complex circuits which are intrinsically safe very difficult, while the latter method is awkward, often resulting in bulky, heavy units (e.g. 28 lbs for a "portable" data collector circuit) containing electrical and/or electronic circuitry which can be difficult, if not impossible, to dismantle or analyse in the event of failure or when maintenance is required.

It is an object of the present invention to avoid or minimise one or more of the foregoing disadvantages.

According to a first aspect of the invention we provide an intrinsically safe circuit for use in a hazardous environment, the circuit comprising: a plurality of circuit sectors which are substantially isolated physically from one another by electrical insulating means, and are electrically connected, directly or indirectly, so as to define at least one power transfer path between each said circuit sector and at least one other said circuit sector; and power limiting means provided in the or each said power transfer path between at least two said connected circuit sectors for limiting the maximum power transfer value therebetween to a value less than a predetermined threshold value at which combustion in said hazardous environment is initiated.

A circuit sector may be a collection of electrical components arranged in a functional block e.g. a digital signal processor (DSP), cache memory, central processing unit (CPU). Alternatively a circuit sector may comprise a single circuit element, for example a high value capacitor or inductor. Alternatively, a circuit sector may comprise a collection of circuit arrangements to which a plurality of voltages are supplied e.g. a liquid crystal display (LCD) having +5V drive voltage and −18V bias voltage applied thereto. It will be appreciated through that all the circuit sectors, taken together, define a single intrinsically safe circuit. A power transfer path is herein defined as an electrical path via which current may be transferred from one circuit sector to another circuit sector, without passing through any other circuit sector. Two circuit sectors which are linked by such a power transfer path are herein referred to as "adjacent" circuit sectors. For example, where a power transfer path exists between two circuit sectors, if one circuit sector short circuits then stored charged therein may discharge directly onto the other circuit sector via the power transfer path therebetween.

Preferably, the circuit includes power limiting means provided in each said power transfer path between circuit sectors for limiting the maximum power transfer values between adjacent circuit sectors to values less than a predetermined threshold value at which combustion in said hazardous environment is initiated.

Each circuit sector will have its own maximum power dissipation value which is the maximum power in the circuit sector in normal operation thereof. If a short circuit were to occur in one of the circuit sectors, any other circuit sectors electrically connected thereto via a power transfer path therebetween could then transfer power to the short-circuited circuit sector, the maximum power dissipation which could be transferred from any circuit sector being the maximum power dissipation value of that circuit sector. The maximum power which could be applied to any given circuit sector at any given time will thus be the circuit sector's own maximum power dissipation value plus the sum of the maximum power dissipation values of all other circuit sectors connected thereto via one or more power transfer paths (i.e. all other adjacent sectors). The "maximum power transfer value" between two adjacent circuit sectors is defined herein as the sum of the maximum power dissipation values of each of the two circuit sectors.

The electrical isolating means physically separating the circuit sectors may, for example, be air, an encapsulating material, a solid material, or a combination or mixture of these. For example, a resin and air mixture may be poured onto the components of one or more of the circuit sectors so as to encapsulate that circuit sector or those circuit sectors. Alternatively, or additionally, one or more of the circuit sectors may be covered in a prefabricated sleeve or cover of insulating material formed by, for example, extrusion or moulding.

The power limiting means preferably comprises one or more current limiting elements, preferably in the form of resistor means. At least one current-limiting resistor may be provided in each said power transfer path in the intrinsically safe circuit, said resistors being provided in series with the circuit sectors.

Alternatively, the power limiting means may comprise one or more "Underwriters-Labs approved" opto-coupler devices (also sometimes referred to as opto-isolators), or one or more transformers or capacitors, although transformers and capacitors are generally less preferred since these are themselves energy storing devices.

The intrinsically safe circuit may further include power supply means for connection to at least one of said power transfer paths so as to supply power to at least two adjacent ones of said circuit sectors. Where this is the case, we may provide at least one power limiting means, for example a resistor, in the electrical path defined between the power supply means and each said circuit sector powered thereby. Preferably, the circuit further includes fuse means in the electrical path between said power supply means and each said circuit sector supplied thereby, and at lease one resistor is provided in series with said fuse means, between the fuse means and the respective circuit sector.

According to a second aspect of the present invention we provide a method of limiting power transfer in an intrinsically safe circuit for use in a hazardous environment, comprising providing a plurality of circuit sectors which are substantially isolated physically from one another by electrical insulating means, electrically connecting said circuit sectors, directly or indirectly, so as to define at least one power transfer path between each said circuit sector and at least one other said circuit sector; supplying power to each said sector, directly or indirectly; and providing power limiting means in the or each said power transfer path between at least two said connected circuit sectors so as to limit the maximum power transfer value therebetween to less than a predetermined threshold value at which combustion in said hazardous environment is initiated.

Preferably, we provide power limiting means in each said power transfer path so as to limit the maximum power transfer values between adjacent circuit sectors to values less than a predetermined threshold value at which combustion in said hazardous environment is initiated.

According to a third aspect of the invention we provide an intrinsically safe circuit for use in a hazardous environment, the circuit comprising: a plurality of circuit sectors which are substantially isolated physically from one another by electrical insulating means, the circuit sectors being electrically connected, directly or indirectly, so as to define at least one power transfer path between each said circuit sector and at least one other said circuit sector, and wherein at least two said circuit sectors having at least one power transfer path defined therebetween have different sparking voltages; and voltage clamping means associated with each said power transfer path between two said circuit sectors having different sparking voltages, for reducing the maximum voltage which may be applied by one of said two circuit sectors to the other of said two circuit sectors.

This allows the maximum voltage drop over at least one of the circuit sectors to be assessed at a lower value than would otherwise be necessary. This in turn allows this circuit sector to be designed with a higher capacitance than would otherwise be possible if the maximum power transfer value between the two connected circuit sectors is to be set at less than a predetermined value at which combustion in said hazardous environment is initiated.

For the avoidance of doubt the "sparking voltage" of a circuit sector is defined as the difference (in magnitude) between the maximum positive voltage and maximum negative voltage that can be present in a circuit sector at any given time. The sparking voltage can be determined by voltages generated within a circuit sector and/or by voltages from outside a circuit sector and which have been connected to the circuit sector.

The voltage clamping means may comprise diode means, for example one or more zener diodes. For example, where two adjacent circuit sectors having different sparking voltages having a single power transfer path therebetween, one or more zener diodes may be incorporated in said power transfer path, conveniently connected across at least one set of voltage rails via which a voltage signal is transferred between said two adjacent circuit sectors, so as to clamp the voltage in said power transfer path between the two adjacent circuit sectors at a set level.

Where there are two adjacent circuit sectors having different sparking voltages, and both sparking voltages are of the same polarity (i.e. positive or negative) with respect to each other, voltage clamping means preferably in the form of one or more zener diodes may be provided for clamping the voltage in the power transfer path therebetween at a level (with respect to a common ground) which is less than the higher of the two circuit sector sparking voltages. Where there are two adjacent circuit sectors having different sparking voltages which are of opposite polarity (i.e. one positive, one negative), voltage clamping means preferably in the form of one or more diodes may be provided for clamping the voltage in the power transfer path therebetween at a level (with respect to a common ground) which is between the two circuit sector sparking voltages.

According to a fourth aspect of the invention we provide an method of controlling voltages in an intrinsically safe circuit for use in a hazardous environment, comprising: providing a plurality of circuit sectors which are substantially isolated physically from one another by electrical insulating means; electrically connecting the circuit sectors, directly or indirectly, so as to define at least one power transfer path between each said circuit sector and at least one other said circuit sector; supplying power to each said sector, directly or indirectly, so that at least two said circuit sectors having at least one power transfer path defined therebetween are provided with different sparking voltages; and providing voltage clamping means associated with each said power transfer path between two said circuit sectors having different sparking voltages, for reducing the maximum voltage which may be applied by one of said two circuit sectors to the other of said two circuit sectors.

It will be appreciated that the intrinsically safe circuit of the invention may include both power limiting means and voltage clamping means as above-described in order to both limit power transfer and control voltages in the circuit. Thus, in accordance with a fifth aspect of the invention, we provide an intrinsically safe circuit for use in a hazardous environment, the circuit comprising: a plurality of circuit sectors which are substantially isolated physically from one another by electrical insulating means, and are electrically connected, directly or indirectly, so as to define at least one power transfer path between each said circuit sector and at least one other said circuit sector, and wherein at least two said circuit sectors having at least one power transfer path defined therebetween have different sparking voltages; power limiting means disposed in the or each said power transfer path between at least two said connected circuit sectors for limiting the maximum power transfer value therebetween to a value less than a predetermined threshold value at which combustion in said hazardous environment is initiated; and voltage clamping means associated with each said power transfer path between two said circuit sectors having different sparking voltages, for reducing the maximum voltage which may be applied by one of said two circuit sectors to the other of said two circuit sectors.

In the above-described intrinsically safe circuits, advantageously there is used a limited number of connecting wires between each two adjacent circuit sectors. Preferably, the number of connecting wires is limited to four or less between at least one or more pairs of adjacent circuit sectors.

According to another aspect of the invention we provide a personal computer (PC) incorporating an intrinsically safe circuit according to any of the afore-described first, third and fifth aspects of the invention.

According to yet another aspect of the invention we provide a data collector circuit consisting of an intrinsically safe circuit according to any of the afore-mentioned first, third and fifth aspects of the invention.

Preferred embodiments of the invention will now be described by way of example only and with reference to the accompanying drawings in which.

Table A2 of British Standard EN50020, appearing at page 50 thereof, defines the maximum capacitance that is allowed for a given voltage and gas group. This is the maximum capacitance which can be safely present in an intrinsically safe circuit to which this voltage is applied, if combustion of the gas is to be avoided. For example, taken from Table A2, at 6V and in hydrogen gas (gas group IIC in Table A2), a maximum capacitance of 40 $\mu$F is allowed in the intrinsically safe circuit when designing the circuit for situations in which the gas will always be present. The need to avoid exceeding the maximum allowed capacitance when designing intrinsically safe circuits is a significant limitation.

Figure 1:
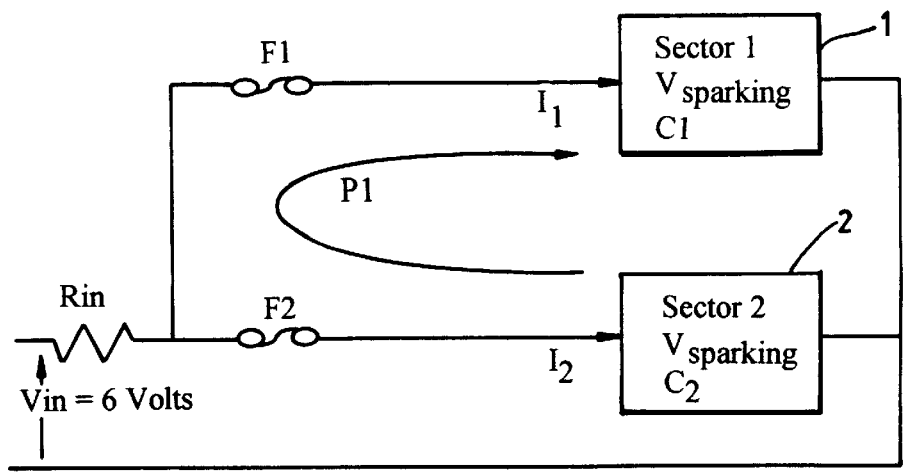
FIG. 1 is a schematic diagram of a circuit including two circuit sectors.

FIG. 1 shows a simple circuit incorporating two circuit sectors 1,2. In this embodiment, one sector 1 (hereinafter referred to as Sector1) is a central processing unit (CPU) of a computer system and the other sector 2 (hereinafter referred to as Sector) is an analogue sector incorporating a plurality of electrical components, some of which may, for example, be capacitors, inductors, resistors, or other components. The two sectors 1,2 are connected to a common 6V voltage supply Vin, and a respective fuse F1,F2 is disposed in each path between the voltage supply and each sector, for limiting the power allowed into each sector 1,2. The input voltage Vin is supplied across an input resistance Rin, as shown. A voltage of 6V is thus supplied to each sector 1,2. All the individual capacitances present in each sector add together to give a total capacitance of C1 in Sector1 and C2 in Sector2. A power transfer path P1 exists between the two sectors. That is to say, if, for example, a short circuit were to occur in Sector1 that discharges the total capacitance C1 therein, there is nothing to stop current flowing from Sector2, via the transfer path P1 defined therebetween (containing the fuses F1 and F2), to Sector1 to add to the short circuit current therein. Thus, in order to meet the specified capacitance limitations in the afore-mentioned standard EN50020, the sum of the capacitances C1,C2 of the two sectors must be less than the value stated in table A2 i.e. for a 6V supply, must be less than 40 $\mu$F. This considerably reduces the amount of capacitance available for each sector, when these sectors are being designed.

Figure 2:
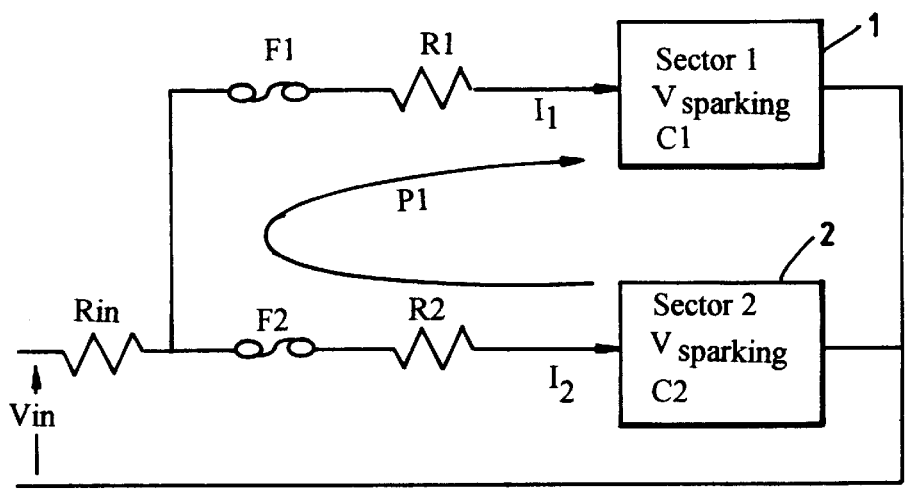
FIG. 2 is a schematic diagram of an intrinsically safe circuit including two circuit sectors.

FIG. 2 shows a modified version of the circuit of FIG. 1 is which resistive barriers have been employed. In this circuit, two resistors R1,R2 have been included, in series with the fuses F1,F2, one resistor R1 being disposed between Sector1 and its respective fuse F1, and the other resistor R2 between Sector2 and its respective fuse F2. These resistors limit the current flow from Sector1 to Sector2 under short circuit conditions and thus the capacitances C1 and C2 of the two sectors 1,2 need not be added together when calculating the maximum capacitance in the circuit. The resistances R1 and R2 are chosen to be of a size sufficient to entirely dissipate current flow from Sector1 and Sector2, or vice versa, in short circuit conditions. This size is determined by the capacitance and sparking voltage of each sector and in accordance with Ohm's law. In the described embodiment, the required resistances R1 and R2 would thus be: R1=$V_{sparking}$/C1, R2=$V_{sparking}$/C2, where $V_{sparking}$ is the same for both sector 1 and sector 2. (See later for full description of sparking voltages).

In the arrangement of FIG 2, the input resistance Rin must also be large enough to dissipate the maximum allowed current if we assume the junction between Rin and F1 and F2 is not infallible i.e. it may become shorted to ground (e.g. at point A) during a fault. For example let us assume Vin=6 volts and we are designing for IIC operation, that is an area that has continues possibility of the presence of hazardous gas and the gases present are typified by hydrogen. From table A2 of British Standard EN50020 we can derive that the maximum capacitance allowed is 40 $\mu$F and from table 1A of the same standard the maximum (sparking) current allowed is 3.33 A. Thus Vin/Rin must be less than 3.33 A.

$Rin \geq 6/3.33$ i.e. $Rin \geq 1.8$ Ohms

However the spark caused by shorting junction point A would also have energy transferred from the capacitive energy stored in Sector 1 and/or sector 2 if a respective power limiting resistor R1, R2 were not present between the voltage input Vin and Sector 1 and/or Sector 2. For example, if only one resistor were used in the power transfer path between sectors 1 and 2, Rin would need to be calculated based on the maximum allowable current (3.33 A) arising from both the voltage input Vin and the capacitive energy stored in that Sector 1, 2 which is linked directly to the input resistor Rin via only a fuse F1,F2.

It will be appreciated that instead of resistors, other current limiting means could be employed e.g. optocouplers, in order to prevent current flow from one sector to the other in short circuit conditions. Moreover, more than two current-limiting resistors may be employed in the power transfer path F1 or, alternatively, a single current limiting resistor could be employed as long as a suitable value or values of resistance is/are chosen in order to dissipate the maximum power transfer value between Sector 1 and Sector 2.

It will also be appreciated that this principle of current limiting may be employed in any circuit incorporating a number of circuit sectors, each sector being connected to at least one other sector (hereinafter called an "adjacent sector") by at least one power transfer path, and the sectors being connected so that all the sectors are connected together, some sectors being connected together directly (via a power transfer path) and others being connected indirectly (via other sectors). One or more current limiting means, for example resistors, will generally be employed between each two adjacent sectors.

Turning to a different aspect of the present invention, each circuit sector will have what is known as a "sparking" voltage. This is the difference (in magnitude) between the highest voltage and the lowest voltage in a circuit sector. All voltages are measured with respect to a common reference voltage, such as ground. For example, if a sector has a +5 volt supply and a −3 Volt supply, then it is assessed at sparking voltage of 8 Volts. The sparking voltage is used when looking up table A2 of the EN50020 British Standard to calculate maximum capacitances allowed for an intrinsically safe circuit.

Normally, a circuit sector's sparking voltage is assessed at the voltage of the power supply which is powering it. However, there are two cases where the sparking voltage will be higher than the supply voltage from the power supply powering it:

1) If the sector is connected externally to another voltage that is higher than the supply voltage, or of a different polarity to the supply voltage; and 2) If the sector contains devices or components that generate voltages higher than the supply voltage or which invert the polarity of the supply voltage.

In either of these two cases the sparking voltage must be assessed at an increased value (greater magnitude), and this reduces the maximum capacitance which is allowed to be incorporated in the sector in order to meet the Table A2 requirements of the EN50020 standard.

In the example circuit of FIG. 1, Sector1 may be assessed at a sparking voltage equal to the supply voltage, Vin i.e. Vsparking1=Vin=6V. However, if a further voltage of 9V, for example, is supplied to a device in Sector2, Sector2 must be assessed at a sparking voltage of Vsparking2=9V. Because Sector1 is connected to Sector2 via power transfer path P1, containing fuses F1 and F2, the maximum voltage which could be applied to Sector1 is therefore the higher sparking voltage of Sector2, namely 5V. This reduces the allowed capacitance C1 which can be used in Sector1 if the circuit as a whole is still to meet the requirements of an intrinsically safe circuit (as set out in Table A2 of EN50020).

Figure 3:
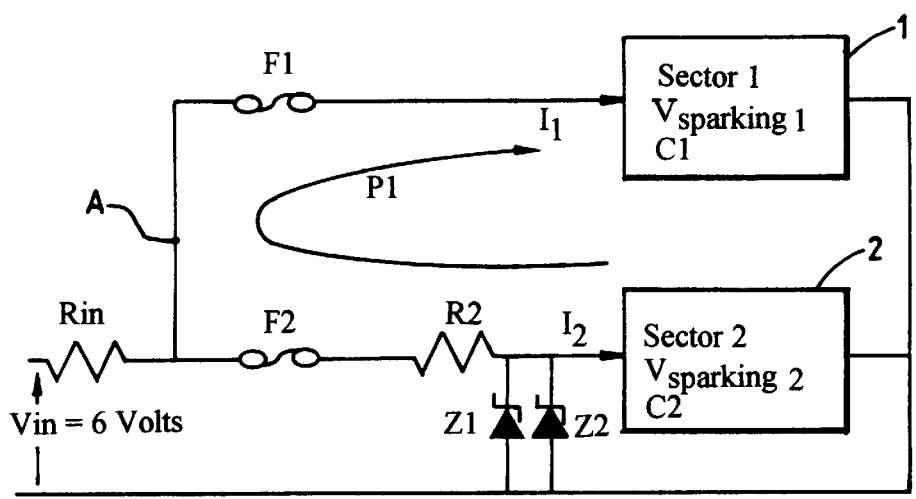
FIG. 3 is a schematic diagram of another intrinsically safe circuit incorporating two circuit sectors.

FIG. 3 illustrates another modified version of the circuit of FIG. 1. In FIG. 3 voltage clamping means in the form of two Zener diodes Z1,Z2 are used to clamp the voltage from Sector2 at the rated voltage of the Zener diodes, so as to limit the voltage which can be imposed on Sector1. By choosing Zener diodes rated at voltages lower than the sparking voltage of Sector2 this enables a higher capacitance C1 to be used in Sector1 than would be possible if Sector1 had to be assessed with a voltage of Vsparking2=9V. The use of Zener diode clamps in this manner will be described in further detail with reference to the following examples.

EXAMPLE 1

Sector 1 has a maximum positive voltage of +6 Volts.
Sector 2 has a maximum positive voltage of +24 Volts.
Neither sector as a negative supply.
This example is typical of a digital section connected to 4–20 mA loop.

Without the zener diodes, sector1 would have to be assessed at 24 volts. If each zener has a voltage rating of between 24 volts and 6 volts then sector1 would be assessed at the zener voltage. If the zener was lower than 6 volts than sector 1 would be assessed at 6 volts. It would be normal practice to use zeners that are slightly lower than sector1's voltage, such as 5.6 volt zeners.

The zener clamps any signals along the signal line from Sector2 (to Sector1) to the rated voltage of the zener, hence voltages of higher than the zener voltage cannot enter sector1 from sector2.

EXAMPLE 2

Sector1 has a maximum positive voltage of +6 Volts but no negative voltage rails.
Sector2 has a maximum positive voltage of +24 Volts with respect to a common reference and has a −5 volt rail.

This is typical of a digital sector connected to analogue circuitry, that is in turn connected to a 4–20 mA loop. Without the zener diodes, sector1 would have to be assessed at 29 volts (24+5 volts). Again if the zener has a voltage rating of between 24 volts and 6 volts then sector1 would be assessed at the zener voltage plus the reverse voltage of the zener diode (say 1 volt). If the zener was lower than 6 volts then sector 1 would be assessed at 6 volts. Again it would be normal practice to use zeners that are slightly lower than sector1's voltage, such as 5.6 volt zeners.

EXAMPLE 3

Sector1 has a maximum positive voltage of +6 Volts but no negative voltage rails.
Sector2 has a maximum positive voltage of +5 Volts with respect to a common reference and has a −5 volts rail.

This is typical of a digital sector connected to analogue circuitry.

In this example there is no need to clamp voltages higher than Sector1's voltage. The requirement is to clamp the negative voltage. Thus it will be appreciated that the zeners could be replaced by a diode voltage clamp.

It will again be appreciated that this principle of voltage clamping is applicable to any intrinsically safe circuit incorporating a plurality of circuit sectors. By applying voltage clamping to any input/output power lines of any given sector, that sector's voltage may be claimed to a limited value. Voltage clamping could be applied to every sector in the circuit, or to only one or some of the sectors, as necessary (depending on the sparking voltages of each sector).

It will be appreciated that two zener diodes are used in the embodiment of FIG. 3 in order to meet a "one-fault" safety condition. If a "two-fault" condition were to be met, three zener diodes would need to be used.

If will be appreciated that the techniques of current limiting and voltage clamping can be used together in an intrinsically safe circuit. FIG. 3 illustrates this principle by including a current limiting resistor R2 in the power transfer path P1. This resistor R2 is connected in series with Sector2, between Sector2 and the respective fuse F2.

Figure 4:
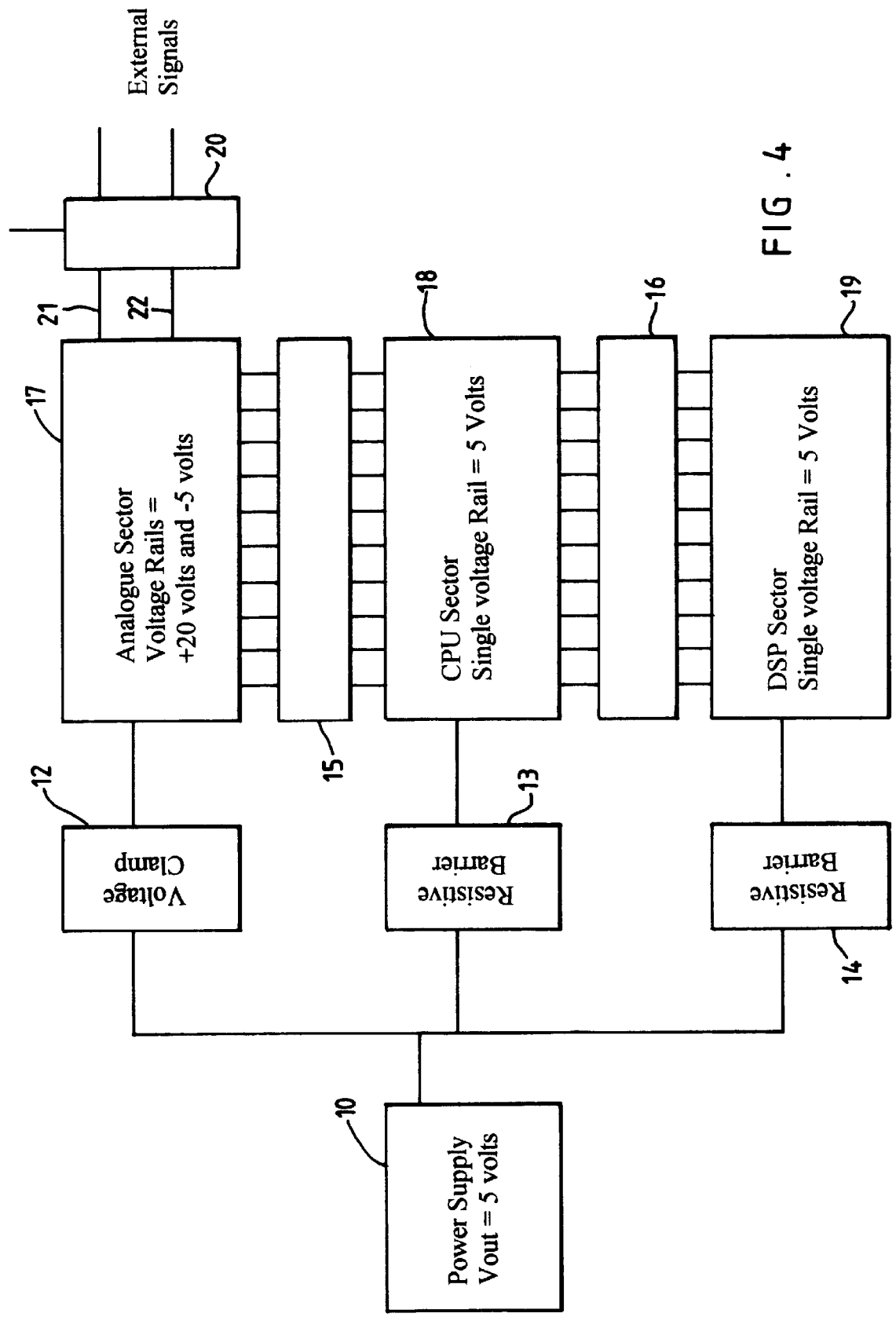
FIG. 4 is a schematic diagram of another intrinsically safe circuit incorporating three circuit sectors.

FIG. 4 illustrates a more complex circuits employing both power limiting (namely current limiting) in the form of resistive barriers, and voltage clamping barriers. This circuit performs the function of a microprocessor based system. The circuit comprises a power supply 10 with a 5Volt output, and three sectors 17,18,19, these being an analogue circuit sector 3, CPU sector 18, and DSP sector 19. The sectors are all substantially isolated from one another by air. Each sector is connected to the power supply 10 which functions as a common supply for all three sectors, the sectors being connected such that power transfer paths exist between each sector and each of the other two sectors. Moreover, the analogue sector 17 is connected via several power transfer paths to the CPU sector 18, and the CPU sector 18 is connected via several power transfer paths to the DSP sector 19. The CPU and DSP sectors 18,19 each have a single voltage rail supplying 5Volts thereto from the power supply 10. The analogue sector 17 has a voltage rail supplying 5V thereto from the power supply 10, as well as internal voltage rails supplying +20V and −5V in the sector.

A resistive barrier 13 is included between the CPU sector 18 and the power supply 10, and another 14 between the DSP sector and the power supply 10. Further resistive barriers 16 (shown as one block) are included directly between the CPU sector and DSP sector in each power transfer path therebetween. A voltage clamping barrier is included between the analogue sector 17 and the power supply. This voltage clamping barrier stops the sparking voltage of the analogue sector 17 being imposed on either the CPU Sector 16 or the DSP Sector 19 via the analogue sector's connection to the power supply. Two further voltage clamping barriers are also employed to two input/output lines 21,22 from the analogue sector which connect this sector, directly or indirectly, to other circuit sectors (not shown). External voltage signals could potentially be applied to the Analogue Sector 17 via these two signal lines 21,22 and the voltage clamping barriers 20 (shown as one block) prevent this. Further voltage clamping barriers 15 (shown as one block) are provided in each further power transfer path between the analogue sector 17 and the CPU sector 18 for preventing the sparking voltage of the analogue sector being applied to the CPU sector (in a fault condition).

The resistive barriers reduce the amount of energy than can flow between the CPU and DSP sectors under short circuit/fault conditions in either of the two sectors. The voltage clamping barriers 12,15 between the Analogue Sector 17 and the CPU Sector 18 in the power transfer path to the DSP Sector 19 in fact also incorporate current limiting resistors of the type which will be described hereinbelow, which resistors limit power transfer from the Analogue sector to the CPU Sector or DSP Sector under short circuit conditions.

Figure 5:
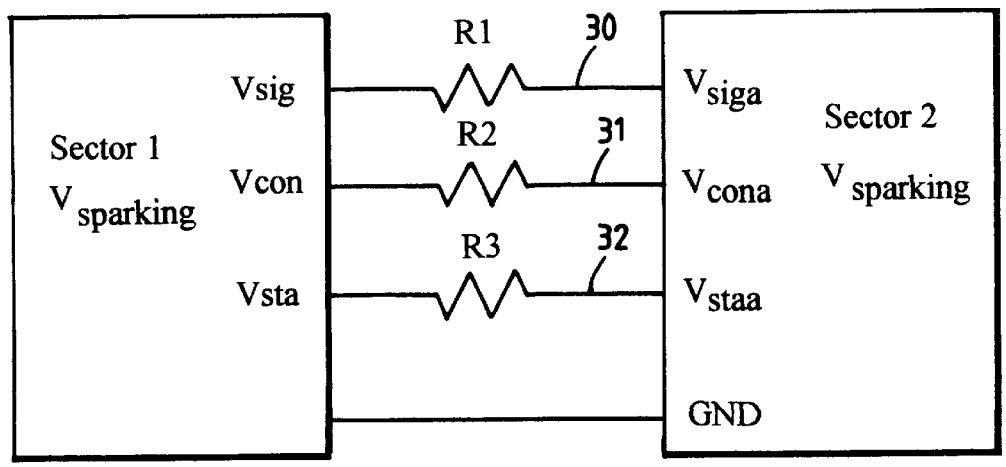
FIG. 5 is a detailed schematic of a resistive barrier used in the circuit of FIG. 4.

FIG. 5 illustrates three resistive barriers R1,R2,R3 in three power transfer paths 30,31,32 between a first sector, Sector1, and a second sector, Sector2 which resistors limit current flow therebetween via these transfer paths. The resistive barriers provided in the circuit of FIG. 4 are of this type. In FIG. 5, three connecting lines between the two sectors are shown, these being a signal line Vsig, a statue line Vsta and a control line Vcon. If there are other connecting lines between the two sectors, these will also contain similar resistive barriers.

INTER SECTOR POWER TRANSFER

A resistive barrier is used where the voltages in the two connected sectors are the same or it is acceptable to have both sectors assessed with the same sparking voltages. If this is not the case then a voltage clamping barrier is used, although current limiting resistors will normally also be incorporated in the voltage clamping barrier.

To calculate power transfer all the resistors are taken to be in parallel. Hence in FIG. 5:

$$R_{equivalent} = R1 // R2 // R3.$$

The maximum possible power transference is calculated using the maximum power transference theorem. Hence the maximum power transference from sector1 to sector2 would be Maximum power transference=$(V_{power}/2)^2/R_{equivalent}$ where $V_{power}$ is the maximum voltage which is assessed to be potentially present in Sector1.

If the voltage ($V_{power}$) that sector1 and sector2 are respectively assessed at for such power calculations are the same, then the maximum power transference from sector2 to sector1 would be the same. If the voltages are different then sector 2's voltage should be substituted into the equation above.

Normally the signal lines can operate with relatively high values of series resistance, without signal degradation. Typically the resistors can be 1 kOhm or higher and the voltages involved are low, typically 6 volts. Thus the maximum power transference with three lines would be:

$$(6/2)^2/(1k//1k//1k) = 27 \text{ mW}.$$

This is the maximum power which would be transferred from one sector to the other, in the event of short circuit(s) occurring. This is insignificant compared with the 1.3 Watts that may be available in a sector.

If opto-couplers are used instead of resistors as the power limiting elements in the power transfer paths, then the power transfer between sectors would be zero.

Figure 6:
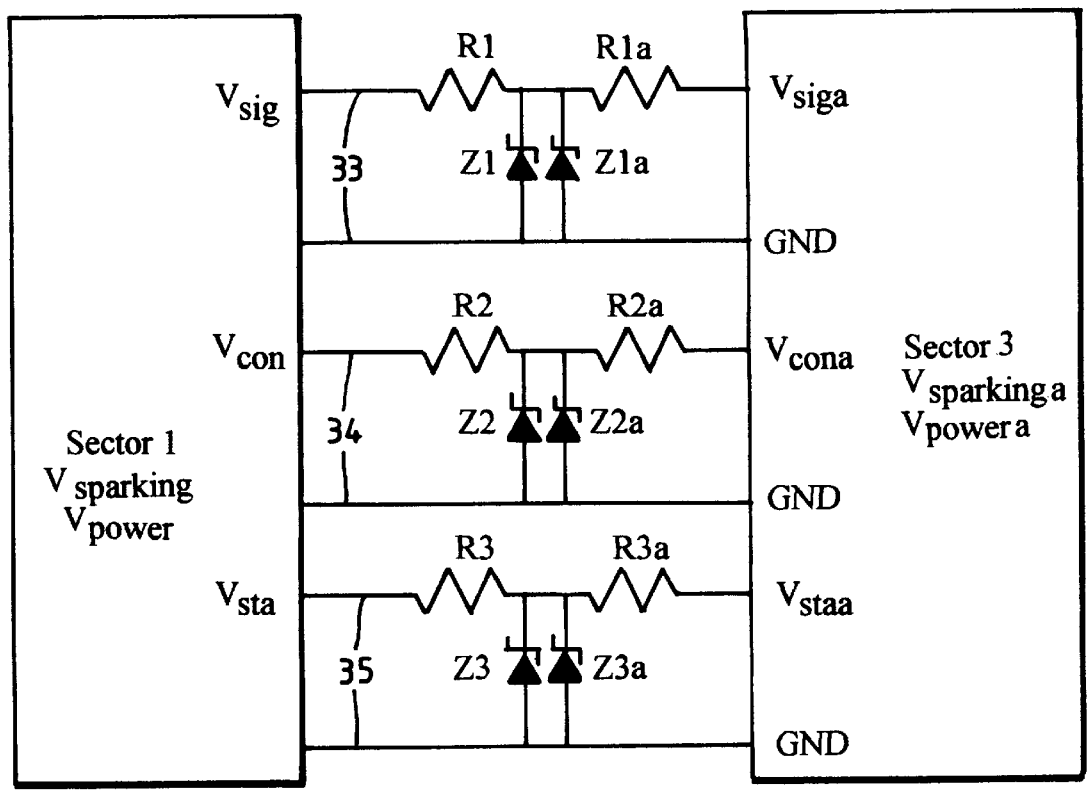
FIG. 6 is a detailed schematic of a voltage clamping barrier used in the circuit of FIG. 4.

FIG. 6 illustrates three voltage clamping barriers 15 in three power transfer paths 33,31,35 between a first sector, sector1, and a second sector, sector2. The clamping barriers used in the circuit of FIG. 4 are of this type. In the FIG. 6 arrangement, a "one-fault" condition is applied so two zeners need to be provided in each case where one zener is needed (i.e. if one zener fails, another is there as a back-up).

Sector1 has a maximum positive voltage of +6 Volts but no negative voltage rails. Sector2 has a maximum positive voltage of +6 Volts with respect to a common reference and has a −20 volt rail. This is typical of a digital sector connected to an LCD.

Without the zener diodes, sector1 would have to be assessed at 26 volts (20+6 volts). Again with the zener diodes in place voltages greater than the saturated voltage of one diode (where both diodes have the same voltage rating) cannot be transferred to sector1. Hence sector1 is assessed at 6 volts +1 volt (saturation voltage of a zener diode).

INTER SECTOR POWER TRANSFER

The maximum power transferable between sector1 and 2 in FIG. 6 is calculated as the lower of two cases:

The first case is where the zener diodes are ignored, this gives:

$$R_{equivalent} = (R1+R1a)//(R2+R2a)//(R3+R3a).$$

Maximum power transference=$(V_{power}/2)^2/R_{equivalent}$ (where $V_{power}$ is the maximum voltage which is assessed to be potentially present in Sector 1) for power transference between sector1 and sector2.

The second case is where the zener diodes are taken into account. It is assumed that all the zeners are the same voltage. (If the zeners are of different voltages then power calculations must be done for each signal line and then the individual power transfers added together). Thus:

$$R_{equivalent} = R1a // R2a // R3a.$$

Maximum power transference=$(Z_{voltage}/2)^2/R_{equivalent}$ where $Z_{voltage}$ is the voltage rating of the largest Zener diode.

Figure 7:
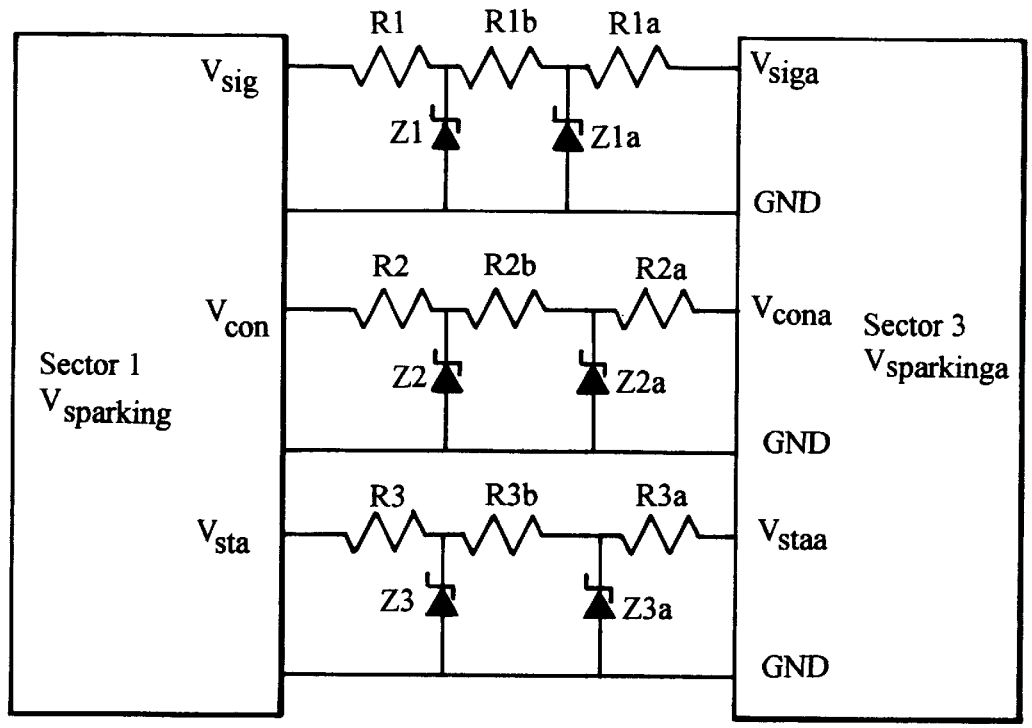
FIG. 7 is a modified version of FIG. 6.

If required, a resistor can be added between any of the zener diode pairs in the voltage barrier arrangement of FIG. 6. This allows automatic test equipment to individually test the correct rating of the active components. FIG. 7 illustrates such as arrangement, where a respective extra resistor R1*b*, R2*b*, R3*b* have been added between the two zener diodes in each of the three power transfer paths.

ASYMMETRICAL VOLTAGE BARRIER

Figure 8:
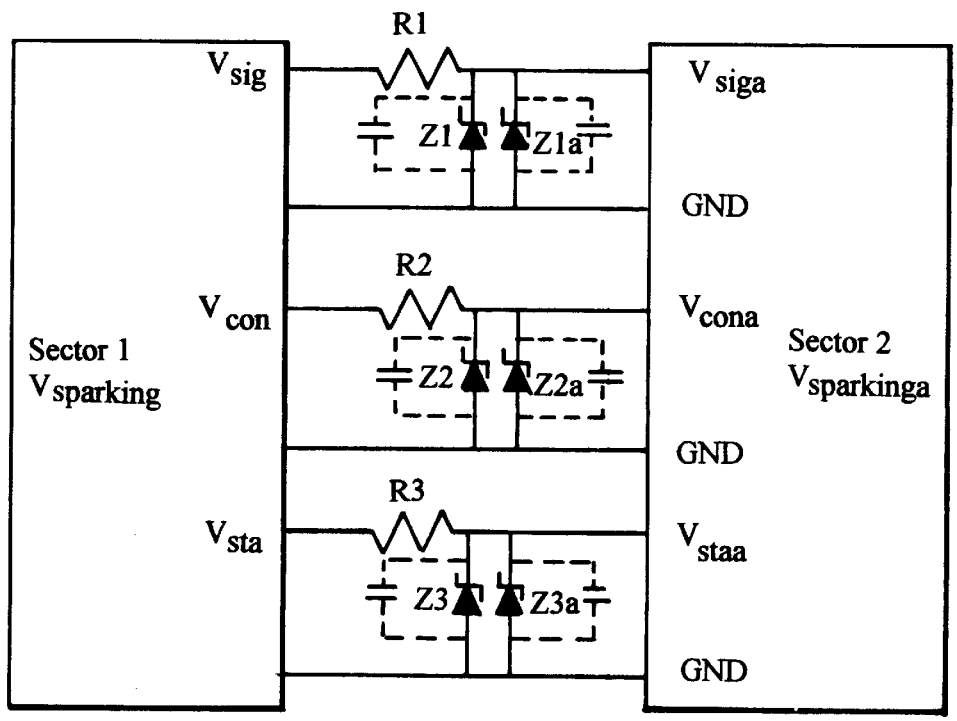
FIG. 8 is an alternative modified version of FIG. 6.

FIG. 8 shows a variant of the voltage clamping barrier arrangement of FIG. 6. Here only one resistor is present in each power transfer path. This circuit has a number of disadvantages as compared with circuit 3. The zener diodes need to be rated high enough to handle safely the full dissipation available in sector2. In FIG. 6 the zeners' dissipation is limited by the series resistance. Normally the signal lines can operate with relatively high values of series resistance, without signal degradation. Typically the resistors are 1 kΩ and the voltages involved are low, say 6 volts. Thus the maximum power dissipation of the zeners would be maximum power transference:

$$(6/2)^2/(1k//1k) = 18 \text{ mW}.$$

This is low compared with the 1 Watt that may be available in a sector. (NE Safety factors, tolerances and ambient temperatures need to be applied to these figures).

There is one main advantage of the circuit of FIG. 8. Zener diodes have a significant equivalent capacitance in parallel (this capacitance is indicated in broken lines in FIG. 8). In the arrangement of FIG. 6, for example, this can cause significant attenuation of signals transferring between the two sectors. Signals been driven from sector2 do not have this problem in the FIG. 8 arrangement.

The three barriers of FIG. 8 may be transposed such that the resistors R1,R2,R3 are on the other side of the barriers. Alternatively, the arrangement may include one or some barriers with resistors on one side and the other barrier(s) with their resistor(s) on the other side.

Figure 9:
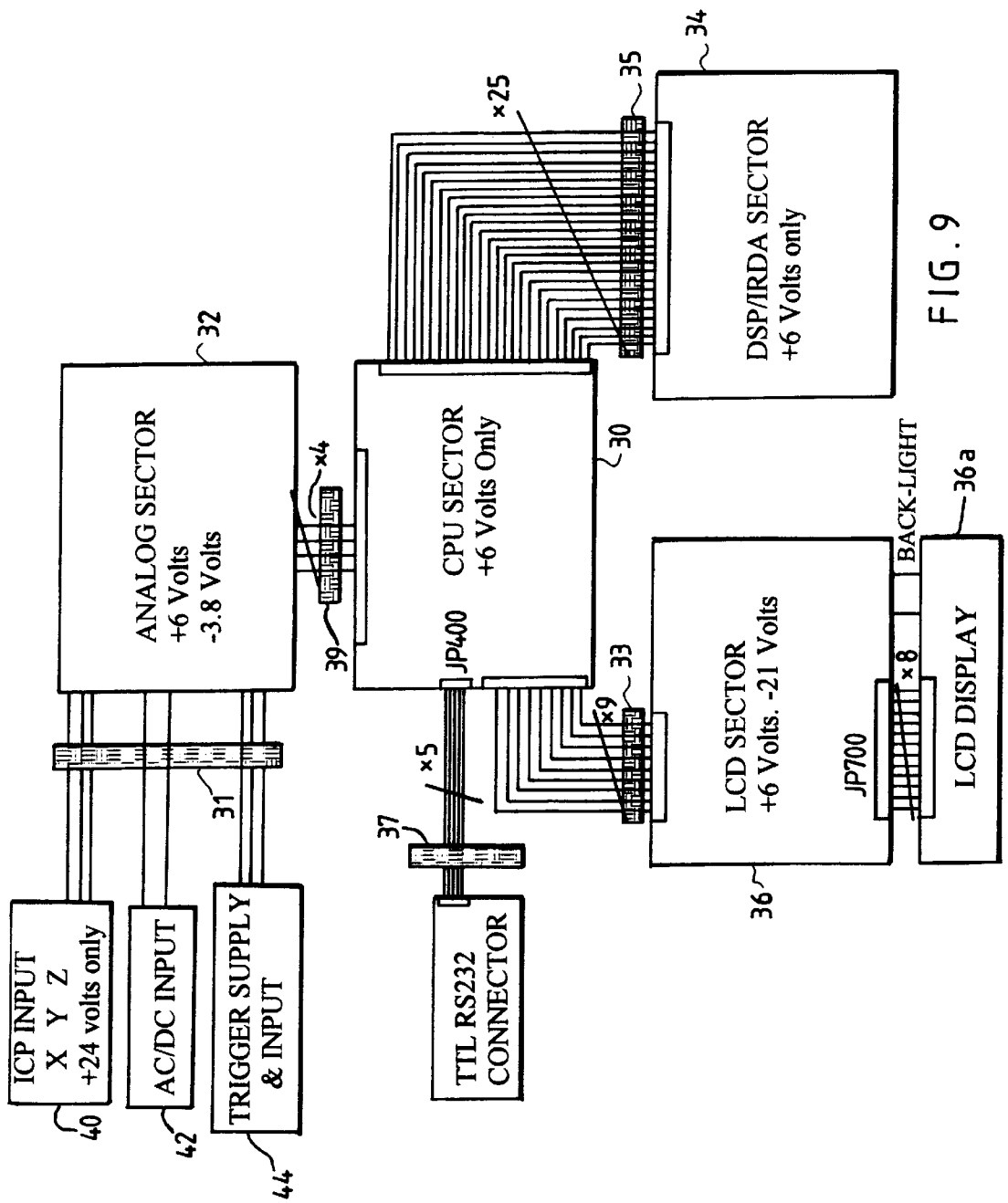
FIG. 9 is a schematic view of another intrinsically safe circuit incorporating at least five circuit sectors.

FIG. 9 illustrates a further intrinsically safe circuit employing resistive barriers and voltage clamping barriers as described with reference to FIGS. 5–8. FIG. 9 is in fact a data collector circuit. The data collector circuit includes a CPU Sector 30, an analogue sector 32, a digital signal processing (DSP/IRDA sector 34, and an LCD sector 36 incorporating an LCD display 36a. A TTL RS 232 Connector 38 is connected to the CPU Sector 30 via voltage clamping barrier block 37, there being five signal lines, and thus five power transfer paths, between the CPU and TTL Connector, a voltage clamping barrier similar to those shown in FIG. 6 being provided in each power transfer path (and mounted on the block 37). There are 25 connecting lines between the CPU Sector 30 and the DSP/IRDA Sector, which lines pass therebetween via a resistor barrier block 35 carrying resistive barriers similar to those shown in FIG. 5, one resistive barrier for each power transfer path. No voltage clamping barriers are required between the CPU and DSP/IRDA Sectors because they have the same sparking voltage of +6 Volts. There are nine connecting lines between the CPU Sector 30 and the LCD Sector 36 which has power rails of +6 Volts and −21 volts therein, while the CPU Sector has a 6 Volt supply only. Thus voltage clamping barriers are provided, in a voltage clamping barrier block 33, in each power transfer path between the CPU Sector and the LCD Sector 36. A further voltage clamping barrier block 31 is provided incorporating voltage clamping barriers on each power transfer path between the analogue Sector 32 and an ICP Input 40, and AC/DC Input 42, and a trigger supply input 44, all connected to the analogue sector 32. The analogue sector 32 has power rails of +6 volts and −3.8 volts therein and so a further voltage clamping barrier board 39 is provided between the analogue sector 32 and the CPU Sector 30 which incorporates a voltage clamping barrier for each of the four power transfer paths therebetween.

A further important feature of the sectored data collector circuit of FIG. 9 is that, where possible, a minimum number of connecting/signal lines are used between sectors. It will be appreciated that in order to provide the necessary resistor barriers and voltage clamping barriers between sectors, each power transfer path between two sectors requires a number of electrical components to be disposed therein. Each of these components (e.g. diodes, zener diodes, resistors) must be physically isolated so that its integrity is not compromised.

This means that if, for example, a standard PCMCIA card was used as one sector in the system, since such a card has 68 wires for connection to other circuits/sectors, this would require two resistors with a large value (such as 68 kΩ) and two zener diodes for each of these 68 power transfer paths, if a voltage clamping barrier were to be incorporated in each of the 68 power transfer paths between the PCMCIA sector and an adjacent circuit sector thereto. This would result in approximately 240 components needing to be accommodated between the two sectors and this is a virtually impossible physical space requirement for the circuit designer to meet. It is thus desirable and advantageous to reduce the number of connecting wires between sectors wherever possible, for example by the use of serial I/O interfaces. Suitable such interfaces would be:

A. 4 Wire Connection

These are synchronous connections. There four wires are typically, data in, data out, clock and a frame signal.

B. 3 Wire Connection

These are like four wire interfaces but they are only one way: either they are read only or write only.

C. 2 Wire Connection

These are a number of different two wire protocols. They can be characterised into synchronous and asynchronous transfer types.

Asynchronous types are typified by RS232 transfer without hardware handshaking.

Synchronous types are typified by Philip's $r^2c$. Where control of the data and clock lines are under software control, master slave relationship exists.

D. Single Wire Connections

An example of a single wire system is that of 1-WIRE BUS system by Dallas Semiconductors. This uses a single bus master and one or more slaves. Writing to and reading from the single wire is controlled by a standard protocol.

So, for example, if a colour LCD display is to incorporated in an intrinsically safe personal computer (PC) circuit, instead of using a standard 16–18 wire interface between the LCD sector and adjacent sector(s) in a sectored circuit, according to our invention we would use, for example, a 4-wire connection interface. This would limit the number of components required in the necessary voltage clamping barriers between the LCD Sector and adjacent sectors (only 4 clamping barriers being required in the 4 power transfer paths between the sectors).

In the data collector circuit of FIG. 9 it should be noted that we have used a single 4-wire interface between the analogue sector 32 and the CPU sector 30. It is further envisaged that a sectored intrinsically safe circuit could be provided in which all adjacent sectors in the circuit are connected by four or fewer wires.

It will be appreciated that further isolation techniques can be employed in connection with the power limiting and voltage clamping techniques as above-described, when designing an intrinsically safe circuit. For example, traditional techniques of encapsulation and/or solid isolation coverings may be used in one or some of the circuit sectors. Encapsulation may, in particular, be used on the connecting wires between sectors. Such connectors could, for example, be encapsulated in silicone rubber.

It will moreover be appreciated that various other modifications to the above-described embodiments are possible without departing from the scope of the invention. In particular, in some cases the intrinsically safe circuits of the invention may not be required to meet the British Standards EN50014 and EN50020 as afore-mentioned, but may need to be designed to meet intrinsically safe circuit standards set by other countries, for example USA Standards, Australian Standards etc. In such cases, the appropriate tables of these standards would be used when calculating maximum capacitances, maximum allowable (sparking) currents etc., in order to determine the required type and size of components for use in the resistor barriers and voltage clamping barriers.

What is claimed is:

1. An intrinsically safe circuit for use in a hazardous environment, the circuit comprising: a plurality of circuit sectors located in the hazardous environment and which are substantially isolated physically from one another by electrical insulating means, the circuit sectors being electrically connected, directly or indirectly, so as to define at least one power transfer path between each said circuit sector and at least one other said circuit sector; power supply means located in the hazardous environment and connected to at least one said circuit sector; and power limiting means provided between said power supply means and each said circuit sector connected thereto, wherein at least two said circuit sectors having at least one power transfer path defined therebetween have different sparking voltages and the intrinsically safe circuit further includes voltage clamping means in each said power transfer path between at least two said circuit sectors having different sparking voltages, for reducing the maximum voltage which may be applied by one of said at least two circuit sectors to another of said at least two circuit sectors.

2. An intrinsically safe circuit according to claim 1, wherein said voltage clamping means comprises diode means.

3. An intrinsically safe circuit according to claim 1, wherein the different sparking voltages of at least two said circuit sectors are of the same polarity and the voltage clamping means comprises at least one zener diode for clamping the voltage in each said power transfer path between two said circuit sectors having different sparking voltages of the same polarity at a level which is less than the higher of the different sparking voltages of the two said circuit sectors.

4. An intrinsically safe circuit according to claim 1, wherein the different sparking voltages of at least two said circuit sectors are of opposite polarity and the voltage clamping means comprises at least one diode for clamping the voltage in each said power transfer path between two said circuit sectors having different sparking voltages of opposite polarity at a level which is between the sparking voltages of the two said circuit sectors.

5. An intrinsically safe circuit according to claim 1, including power limiting means in the form of resistor means disposed in each said power transfer path between at least two said connected circuit sectors for limiting the maximum power transfer value therebetween to a value less than a predetermined threshold value at which combustion in said hazardous environment is initiated.

6. An intrinsically safe circuit according to claim 1, wherein there is used a limited number of connecting wires between each two circuit sectors connected by at least one power transfer path.

7. An intrinsically safe circuit according to claim 6, wherein the number of connecting wires is no greater than four between at least one pair of said connected circuit sectors.

8. A personal computer (PC) incorporating an intrinsically safe circuit according to claim 1.

9. A data collector circuit consisting of an intrinsically safe circuit according to claim 1.

10. An intrinsically safe circuit according to claim 1, wherein the circuit includes power limiting means in each said power transfer path in the intrinsically safe circuit.

11. An intrinsically safe circuit according to claim 1, wherein said power limiting means comprises at least one current limiting element.

12. An intrinsically safe circuit according to claim 11, wherein each said current limiting element comprises resistor means.

13. An intrinsically safe circuit according to claim 11, wherein each said current limiting element comprises fuse means.

14. An intrinsically safe circuit according to claim 1, wherein said electrical insulating means physically separating the circuit sectors comprises air.

15. An intrinsically safe circuit according to claim 1, wherein said electrical insulating means physically separating the circuit sectors comprises an encapsulating material.

16. A method of limiting power transfer in an intrinsically safe circuit for use in an hazardous environment, comprising: providing a plurality of circuit sectors located in the hazardous environment and which are substantially isolated physically from one another by electrical insulating means; electrically connecting the circuit sectors, directly or indirectly, so as to define at least one power transfer path between each said circuit sector and at least one other said circuit sector; supplying power to each said sector, directly or indirectly, so that at least two said circuit sectors having at least one power transfer path defined therebetween are provided with different sparking voltages, including connecting power supply means to at least one said circuit sector; providing power limiting means between said power supply means and each said circuit sector connected thereto; and providing voltage clamping means in each said power transfer path between at least two said circuit sectors having different clamping voltages, for reducing the maximum voltage which may be applied by one of said at least two circuit sectors to another of said at least two circuit sectors.

17. A method according to claim 16, including providing power limiting means in each said power transfer path in the intrinsically safe circuit so as to limit the maximum power transfer values between adjacent circuit sectors to values less than a predetermined threshold value at which combustion in said hazardous environment is initiated.

* * * * *